United States Patent [19]
Rees

[11] Patent Number: 5,295,730
[45] Date of Patent: Mar. 22, 1994

[54] DOUBLE ENVELOPING WORM AND GEAR SEAT RECLINER

[75] Inventor: Richard W. A. Rees, Rochester Hills, Mich.

[73] Assignee: ITT Corporation, New York, N.Y.

[21] Appl. No.: 809,654

[22] Filed: Dec. 18, 1991

[51] Int. Cl.$^5$ .............................................. B60N 2/02
[52] U.S. Cl. ................................ 297/361.1; 297/354.1
[58] Field of Search ............... 297/361, 362, 355, 366, 297/367, 374; 74/458, 440, 409, 421 R

[56] References Cited

U.S. PATENT DOCUMENTS

| | | | |
|---|---|---|---|
| 2,002,746 | 5/1935 | Miller | 74/458 |
| 2,279,414 | 4/1942 | Scott | 74/458 |
| 2,619,845 | 12/1952 | Mackmann et al. | 74/458 |
| 3,535,948 | 10/1970 | Winzeler et al. | 74/440 |
| 3,952,610 | 4/1976 | Hope et al. | 74/421 R |
| 4,227,741 | 10/1980 | Gross et al. | 74/409 X |
| 4,384,744 | 5/1983 | Barley | 297/367 |
| 4,521,055 | 6/1985 | Fudala | 297/362 |
| 4,570,999 | 2/1986 | Harrison | 297/362 |
| 4,573,738 | 3/1986 | Heesch | 297/362 |
| 4,598,947 | 7/1986 | Fourrey et al. | 297/362 |
| 4,685,735 | 8/1987 | McFalls et al. | 297/362 |
| 4,696,515 | 9/1987 | Heesch | 297/374 |
| 4,708,392 | 11/1987 | Werner et al. | 297/361 X |
| 4,739,671 | 4/1988 | Nelson | 74/425 |
| 4,929,024 | 5/1990 | Secord | 297/362 |
| 5,156,439 | 10/1992 | Idlani et al. | 74/409 X |

FOREIGN PATENT DOCUMENTS

| | | | |
|---|---|---|---|
| 2822135 | 11/1979 | Fed. Rep. of Germany | 297/362 |
| 2456265 | 12/1980 | France | |
| 2567462 | 1/1986 | France | 297/361 |
| 0571286 | 12/1957 | Italy | 297/361 |
| 89/03322 | 4/1989 | PCT Int'l Appl. | |
| 485142 | 1/1970 | Switzerland | |

Primary Examiner—James R. Brittain
Assistant Examiner—Milton Nelson, Jr.
Attorney, Agent, or Firm—Robert P. Seitter; J. Gordon Lewis

[57] ABSTRACT

A device for adjusting the relative inclination of two elements, and in particular, the relative inclination of a back member of an automotive seat pivotally connected about a rotational axis to a base member of the seat for movement through a predefined arc is disclosed. The device can include at least an enveloping gear sector for pivotal connection to the base member about an axis generally coaxial with the rotational axis between the back and base numbers. The gear sector preferably includes plastic concave teeth formed thereon. An enveloping worm is provided for rotatable connection to the base member. The worm preferably is formed of at least one plastic concave worm having at least a single thread. The worm is disposed in double enveloping engagement with the gear sector. A rotatable cam is pivotally connecting the sector gear to the base member. The rotatable cam is pivotal along a predefined arc about an axis of rotation generally coaxial with the rotational axis of the back member. A spring biases the rotatable cam in a rotational direction such that the gear is urged into positive engagement with the worm at any angular position of movement. A drive mechanism is provided for rotating the worm in clockwise and counterclockwise directions. A releasable lock member is also provided for preventing unintentional movement of the worm in either rotational direction.

20 Claims, 2 Drawing Sheets

DOUBLE ENVELOPING WORM AND GEAR SEAT RECLINER

FIELD OF THE INVENTION

The present invention relates to automotive seat recliners and, more particularly, to a double enveloping worm and gear seat reclining mechanism to permit the controlled manual or motor driven reclining of an automotive seat back.

BACKGROUND OF THE INVENTION

Automotive seats usually include a seat bottom that is affixed to a seat frame. The seat frame is mounted to the floor of the vehicle via a rail-type adjustment system to allow the forward and rearward adjustment of the seat bottom. The seat back is attached to the seat frame by a seat back support. If the seat is a reclining-type seat where the seat back is rotationally movable with respect to the seat bottom, a locking and release mechanism is usually provided. The seat reclining mechanism usually includes a base that is affixed to the structure of the seat frame. The seat back support is pivotally mounted to such base as it is desirable to have the seat back move forward and rearward with the seat bottom. The locking and release mechanism by which the seat back is held in a fixed angular position relative to the seat bottom has several known forms. One form is a ratchet mechanism where a notched wheel is affixed to either the seat back or seat bottom and a pawl is attached to the other. Upon the pawl disengaging the notched wheel, the seat back is released and is free to rotate at its pivot with respect to the seat bottom. Other types of engaging or intermeshing gear-type mechanisms provide a locking and a releasing operation between the seat bottom and seat back.

In manual reclining seat back adjustments, the reclining seat backs may be physically adjusted by the occupant of the seat by releasing a latching or locking mechanism and simply leaning back to displace the seat back to a desired position, at which time the latch or lock is re-engaged. Usually biasing spring means are provided, effective to adjust the seat back forwardly when unlocked and such movement is unopposed by the occupant.

A reclining seat back which is power operated is adjustable both forwardly and rearwardly. The power source typically is a reversible electric motor, which drives the seat back through a train of gears contained in a transmission housing fixed to a seat mount or bracket. In many cases, the gear train can require a large transmission housing, and may also require that a complementary gear train be positioned on an opposite side of the seat back with an interconnecting drive mechanism between the two gear trains, the extra weight of this dual recliner system negates the weight saving which it makes possible in the structure of the seat back frame.

Therefore, it is desirable in the present invention to provide a compact gear train which requires a small amount of space. It is also desirable in the present invention to provide a gear train which exhibits an increased load carrying capacity without a weight penalty that allows the mechanism to be profitably used as both a single or a dual sided recliner. Furthermore, it is desirable in the present invention to provide a gear train with a load carrying capacity capable of eliminating the need for dual transmission housings on either side of a single passenger recliner seat, thereby eliminating the additional space requirements and weight of the duplicate transmission housing and interconnecting actuator mechanism.

Certain drawbacks are also present in the known seat back locking and release mechanisms. Due to the potentially great forces to which a vehicle seat back can be subjected, a locking mechanism at the pivot between the seat back and seat bottom has been a relatively large and heavy unit. This is undesirable in the ongoing attempt at decreasing the weight of vehicles to achieve greater fuel efficiency.

One other problem with such known seat back support locking mechanisms is that a finite number of reclined positions are possible depending on the number of notches in the ratchet wheel. It is not desirable to make the notches very small and closely spaced to provide many possible reclining positions, because of the strength required of the locking mechanism. Rather, the number of reclining positions is limited because of the need to have quite strong notches and protrusions from the ratchet wheel.

A locking mechanism having an infinite number of settings is therefore desirable in the present invention. Further, it is desirable in the present invention to provide extra torque capability with no increase in size of the gear train. In addition, it is desirable in the present invention to provide high shock resistance, and the ability to withstand heavy starting and stopping loads. It is also desirable in the present invention to eliminate backlash in the gear train to greatly reduce or eliminate any undesirable noise or more importantly seat back movement otherwise known as "chuck" that may be caused by forces acting on the seat back especially when the seat is occupied. It is further desirable in the present invention to provide increased durability.

SUMMARY OF THE INVENTION

The present invention provides an improved reclining seat back drive mechanism addressing the perceived disadvantages of the previously-known gear train mechanisms. The present invention provides a seat recliner mechanism for use with a seat back support pivotally mounted to a base frame associated with a seat bottom. Controlled reclining of the seat back is provided by a device for adjusting the relative inclination between a first member and a second member that are pivotally connected to one another. A double enveloping gear and worm mechanism is provided for adjustably driving the first member through a predetermined range of inclination relative to the second member. The double enveloping worm and gear mechanism can include at least a gear sector, and possibly up to an entire gear, pivotally connected to the second member and a worm rotatably connected to the second member for driving the gear sector. The device may also include a motion transfer mechanism for moving the first member in response to movement of the gear sector. The motion transfer mechanism may include a projection and a complimentary aperture formed in the first member and the gear sector for engaged movement in either rotational direction about the rotational axis. Preferably, the motion transfer mechanism is disposed spaced radially from the rotational axis of the pivot connecting the first and second members. The device of the present invention can also include a biasing mechanism for urging the gear sector into engagement with the worm. The biasing means may include a cam pivotally connected between the gear sector and the second member for pivoting the gear sector into engagement with the worm about an offset axis and a spring for biasing the cam in a rotational direction such that the gear sector is driven into positive engagement with the worm. The cam may have an axis of rotation generally coaxial with a rotational axis of the pivot means connecting the first and second members. Manual or powered drive means for rotating the worm in clockwise and counterclockwise directions can be provided. A releasable lock mechanism for preventing unintentional movement of the worm in either rotational direction can also be provided. In the preferred embodiment of the invention, the first member can include a portion of a back member of a seat of an automobile and the second member can include a portion of a base member of the seat. Also in the preferred embodiment of the invention, the double enveloping gear and worm mechanism is formed preferably at least in part of intermeshing double enveloping plastic teeth.

BRIEF DESCRIPTION OF THE DRAWINGS

The various features, advantages and other uses of the present invention will become more apparent by referring to the following detailed description and drawings, wherein throughout the various views, like reference numerals refer to like parts in which.

DETAILED DESCRIPTION OF THE PREFERRED AND ALTERNATIVE EMBODIMENTS OF THE INVENTION

A device, generally designated as 10, according to the present invention allows adjustment of the relative inclination of two elements with respect to one another. A first member 12, such as a seat back, and a second member 14, such as a seat base are connected to one another by pivot means 16 allowing adjustable inclination of the first member 12 relative to the second member 14. Double enveloping gear and worm means 18 is provided for adjustably driving the first member 12 through a predetermined range of inclination relative to the second member 14.

Figure 1:
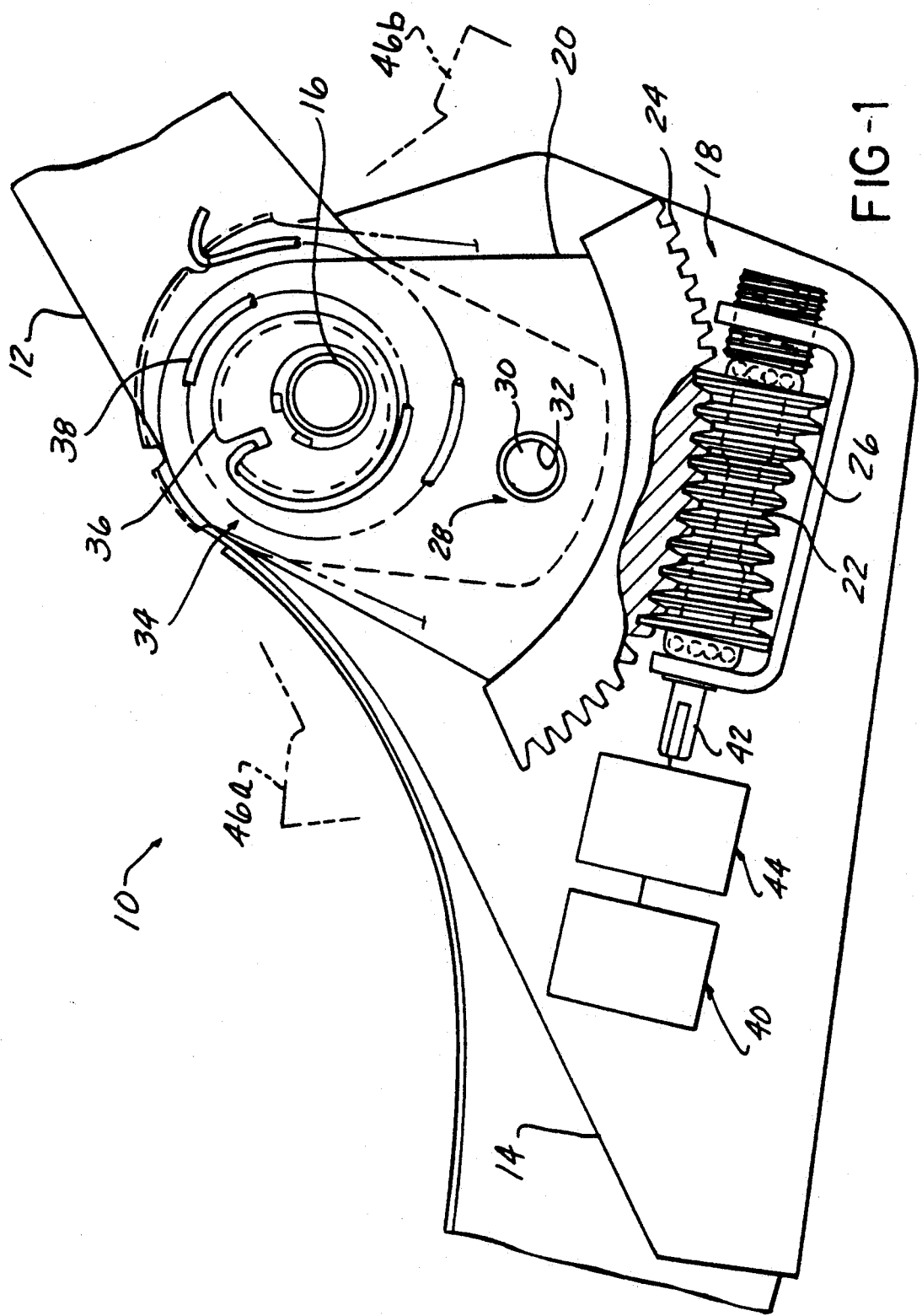
FIG. 1 is a side elevational view of the double enveloping worm and gear seat recliner mechanism according to the present invention with various parts removed and shown in section for clarity.
Figure 2:
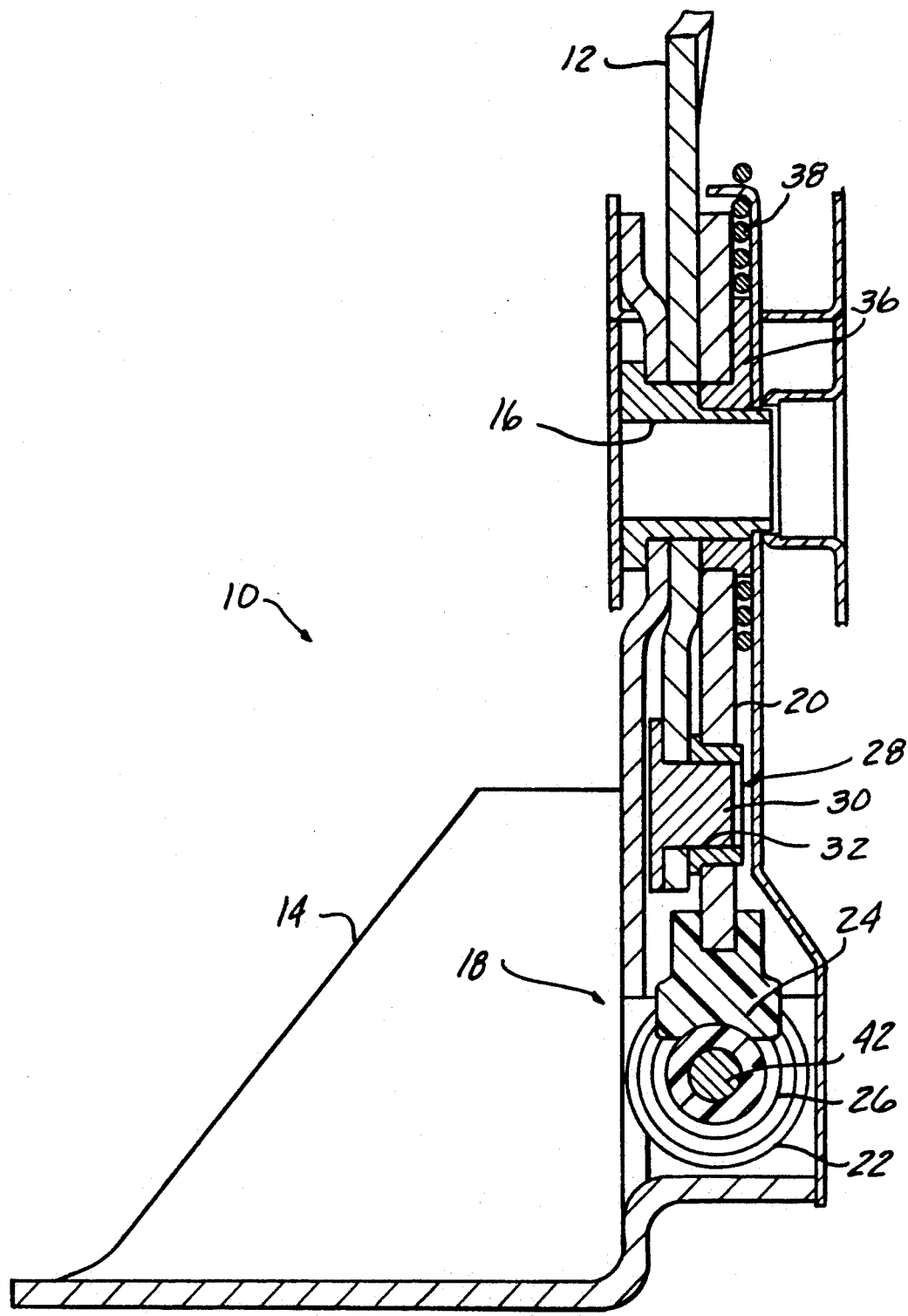
FIG. 2 is a cross sectional view of the double enveloping worm and gear seat recliner mechanism shown in FIG. 1.

The double enveloping gear and worm means 18 can include at least a gear sector 20, or an entire gear, pivotally connected to the second member 14 and a worm 22 rotatably connected to the second member 14 for driving the gear sector 20 about its pivotal axis. The worm 22 is in double enveloping engagement with the gear sector 20. The term double enveloping is meant to convey that the gear teeth 24 have a concave form as best seen in FIG. 2 and that the at least one worm thread 26 also has a concave form as best seen in FIG. 1. Therefore, the worm 22 and gear 20 wrap around each other to greatly increase the load carrying capacity by providing tooth area contact rather than line or point contact and more teeth in mesh with one another. This type of double enveloping design typically can provide contact between ⅔ of the total number of teeth in a full gear and the worm 22. The present invention modifies the typical double enveloping worm and gear configuration slightly by preferably providing a pitch diameter circle of the gear sector which is smaller than the worm by about 20 percent. This provides some clearance between the gear teeth 24 and the at least one worm thread 26 to provide for easier rotational driving of the worm 22 and gear sector 20. This clearance is, of course, zero at the center of the worm but increases towards the two ends of the worm 22. Preferably, the gear teeth 24 and at least one worm thread 26 are formed of plastic material to provide a low co-efficient of friction when in sliding engagement with one another, while allowing the teeth 24 to deform slightly under high load conditions to bring the other gear teeth 24 into contact with the at least one worm thread 26 to increase the load carrying capacity of the mechanism. In fact, it has been found that the present invention can withstand the load requirements of a single passenger seat back using only one seat recliner mechanism thereby eliminating the additional weight and space requirements necessary to place dual seat recliner mechanisms on opposite sides of a single seat as has been done in the past. It has also been found that the seat recliner device 10 according to the present invention has a single or one directional action, and typically cannot be back driven. That is to say, force applied to the first member 12, such as a seat back, does not act through the gear sector 20 to rotate the worm 22.

The device 10 according to the present invention may also include motion transfer means 28 for moving the first member 12 in response to movement of the gear sector 20. In the preferred embodiment of the invention, the motion transfer means 28 can include a projection 30 and a complimentary aperture 32 formed on the first member 12 and the gear sector 20 for interconnecting engagement during motion transferring movement. It should be recognized that the projection 30, such as a pin or rivet connection, can be moved further away from the pivotal axis of the first member 12 and sector gear 20 toward the gear teeth 24 and worm thread 26 interface. The motion transfer means 28 preferably being disposed spaced radially from the rotational axis of the pivot means 16 connecting the first and second members, 12 and 14 to each other respectfully. It is, of course, possible to connect the seat back frame directly and rigidly to the gear sector. However, this gives very high loads on the pivot which makes it difficult for the cam to work properly. The motion transfer means 28 is one way of alleviating this problem. The device 10 according to the present invention can also include biasing means 34 for urging the gear sector 20 into engagement with the worm 22. The gear sector 20 is preferably urged into positive engagement with the worm 22 at any angular position of movement. The biasing means 34 can include cam means 36 pivotally connected between the gear sector 20 and the second member 14. The cam means 36 pivots the gear sector 20 into engagement with the worm 22 about an axis offset from the center of the pitch diameter circle of the gear sector 20. The biasing means 34 can also include spring means 38 for biasing the cam means 36 in a rotational direction, such that the gear sector 20 is driven into positive engagement with the worm 22. The cam means 36 can have an axis of rotation generally coaxial with the rotational axis of the pivot means 16. However, it should be recognized that the axis of rotation of the cam means 36 may be slightly offset from the rotational axis of the pivot means 16 without detrimental affect on the functional performance of the present invention.

Drive means 40 is provided for rotating the worm 22 in clockwise and counterclockwise directions. The drive means 40 may include manual means or power operated means for driving the worm 22 in either rotational direction through a single or double extended shaft 42. The manual means may include an outwardly extending shaft having a manually operated knob attached thereto on an external surface of the seat. The shaft attached to the manually operated knob may be interconnected with the shaft 42 of the worm 22 by means of a gear connection if necessary. The power operated means may include a reversible electric motor connected to shaft 42 allowing rotation of the worm 22 in either rotational direction. If required, a worm 22 with a plurality of worm threads 26 may include a releasible lock means 44 to prevent unintended rotational motion of the worm 22 if subject to being back driven through the sector gear 20 connected to the first member 12. The releasible lock means 44 can include a clutch spring or brake and spline combination as are familiar to those skilled in the art. The drive means 40 and releasible lock means 44 being schematically shown in FIG. 1 of the drawings.

A double enveloping worm and gear allows the quadrant and worm teeth to be molded as a near part blank. The plastic blank then has the worm teeth formed thereon, since directly injection molding a plastic double cone worm would require extremely complex tooling because of numerous undercut surfaces. For example, and not by way of limitation, a suggested length for the worm is 40.0 mm. $PCR_w = 81.0$ mm, therefore, the number of teeth in engagement is equal to approximately 8.5. However, $PCR_g = 67.5$ mm. This gives relief to the outer teeth so that the outer gear teeth 24 only come in contact with the at least one worm thread 26 under load and the center tooth moves progressively bringing more teeth into contact. With minimum material condition on the outer gear teeth, and maximum material on the center tooth, a strain of 11% on the center tooth and hence less strain on the teeth on either side, will bring tooth number 5 into contact. With teeth a nominal size throughout, the necessary strain is 7% on the center tooth.

The suggested material for the worm 22 is ACETAL, and the suggested material for the gear quadrant 20 is NYLON. The gear tooth form is a modified metric module 1.5 with the addendum equalling the dedendum also equaling 1.5. The gear face width is 15.0 mm with a maximum outside radius equal to 71.0 mm. Tooth curvature can be created using a 16.0 mm inner diameter, with a 22.0 mm outer diameter hob. The face contact area between the worm 22 and gear sector 20 is 40.0 square millimeters throughout the length of the worm with an approximate worm maximum outer diameter of 20.0 mm. The outer thread reduced to root diameter from 20.0 mm within 90°.

The worm 22 is preferably a single start for manual recliners having helix angle of approximately 6.58°. This is probably close to the coefficient of friction so operating loads should be very low, and typically much less than is actually specified as optimum. One hand movement will change the back seat angle 1 degree as rotationally operated. It is also possible to make large increment back angle changes, for example in 4° steps, to fully recline the seat back. This may be accomplished by having the quadrant 20 taken out of engagement with the worm 22 by a lever operated mechanism that either moves the worm 22 or gear 20 apart. For instance, using a cam at the center of the gear/seat back support could accomplish this and would also provide means to take up wear in the gear mechanism. A four start worm would have the ability to be driven by the gear, thus allowing the mechanism to be lever operated by locking the worm 22 in place. Assuming a pawl-type lock onto radial serrations, for example, the seat back 12 may be locked in $\frac{1}{4}°$ incremental positions.

Power operation using a single start worm requires a motor giving maximum torque at 1000 revolutions per minute with a 20 to 1 reduction gear box or a dual start worm with a 10 to 1 reduction gear box.

It should be recognized that the design of the present invention separates the light cam force spring means 38 biasing the gear sector 20 into the worm 22 from a typical large clock spring (not shown) to bias the first member 12, such as a seat back in a manually driven seat toward the upright position. In power driven seat recliners, the large clock spring is not required since the reversible electric motor 40 drives the gear in the desired rotational direction to bring the seat into either a reclined position or an upright position. As can be seen from FIG. 1, the gear sector 20 can travel through a predetermined arc as generally shown in phantom at 46A and 46B. It should be recognized that the motion transfer means 28, such as projection 30, or a pin, rivet or the like can be moved further away from the rotational axis of the seat back 12 toward the interface between the gear teeth 24 and at least one worm thread 26 to decrease the pressure on the cam means 36. In summary, the present invention provides for a device for adjusting the relative inclination of two elements, and in particular a back 12 of a seat relative to a base 14 of the seat. The device according to the present invention includes a base member 14 and a back member 12. The base member 14 and back member 12 are connected by pivot means 16 allowing adjustable inclination of the back member 12 relative to the base member 14. Enveloping gear means 20 pivotally connected to the base member 14 provides for selective movement relative to the base member 14 through a predetermined arc. Motion transfer means 28 provides for moving the back member 12 in response to movement of the enveloping gear means 20. Enveloping worm means 22 is rotatably connected to the base member 14 and is in double enveloping engagement with the enveloping gear means 20 for driving the gear means 20 selectively along the predetermined arc.

The motion transfer means 28 can include a projection 30 formed on one of the back member 12 and the gear means 20 with a complimentary aperture 32 formed in the other of the back member 12 and the gear means 22. The motion transfer means 28 is preferably disposed spaced radially from a rotational axis of the pivot means 16 which connects the back and base members 12 and 14 to each other. The present invention may also include biasing means 34 for urging the gear means 20 into engagement with the worm means 22. The biasing means 34 can include cam means 36 pivotally connected between the gear means 20 and the base member 14 for pivoting the gear means 20 into engagement with the worm gear 22 about an offset axis. The biasing means 34 may also include spring means 38 for biasing the cam means 36 in a rotational direction such that the gear means 20 is driven into positive engagement with the worm means 22. The cam means 26 preferably has an axis of rotation generally coaxial with a rotational axis of the pivot means 16. However, it should be recognized that the axis of the cam means 36 may be offset from the rotational axis of the pivot means 16 without detrimental impact on the functional operation of the present invention. Drive means 40 are also provided connected to rotational shaft 42 for rotating the worm means 22 in clockwise and counterclockwise directions. Releasible lock means 44 are also provided for preventing unintentional movement of the worm means 22 in either rotational direction. Preferably, the gear teeth 24 and at least one or more worm threads 26 are formed at least in part of intermeshing double enveloping plastic teeth.

Although the best mode contemplated for carrying out the present invention has been herein shown and described, it will be apparent to those skilled in the art that modification and variation may be made without departing from what is regarded to be the subject matter of the invention disclosed herein. Therefore, the foregoing description is to be considered exemplary, rather than limiting, and the true scope of the invention is that defined in the following claims.

I claim:

1. A device for adjusting the relative inclination of two elements comprising:
    a first member;
    a second member;
    pivot means for connecting the first member to the second member and for allowing adjustable inclination of the first member relative to the second member; and
    double enveloping gear and worm means formed at least in part of intermeshing double enveloping plastic teeth for adjustably driving the first member through a predetermined range of inclination relative to the second member, said gear means having a gear pitch diameter less than a pitch diameter of said worm means and a variable center to center distance between said gear pitch diameter and said worm pitch diameter allowing more plastic teeth to be brought into contact with one another under high load conditions.

2. The device of claim 1 wherein the first member comprises a back member of a seat and the second member comprises a base member of the seat.

3. The device of claim 1 further comprising:
    said double enveloping gear and worm means including at least a gear sector pivotally connected to said second member and a worm rotatably connected to said second member for driving the gear sector, said worm in double enveloping engagement with said gear sector.

4. The device of claim 2 further comprising:
    drive means for rotating the worm in clockwise and counterclockwise directions.

5. The device of claim 2 further comprising:
    releasable lock means for preventing unintentional movement of the worm in either rotational direction.

6. The device of claim 2 further comprising:
    biasing means for urging the gear sector into engagement with the worm during relative movement between said first and second members.

7. The device of claim 6 wherein said biasing means further comprises:
    cam means, pivotally connected between the gear sector and the second member, for pivoting the gear sector into engagement with the worm about an offset axis; and
    spring means for biasing the cam means in a rotational direction such that the gear sector is driven into positive engagement with the worm.

8. The device of claim 7 wherein the cam means has an axis of rotation generally co-axial with a rotational axis of the pivot means.

9. The device of claim 2 further comprising:
    motion transfer means for moving the first member in response to movement of the gear sector.

10. The device of claim 3 wherein said motion transfer means further comprises:
    a projection formed on one of the first member and the gear sector with a complementary aperture formed in the other of the first member and the gear sector.

11. The device of claim 3 wherein said motion transfer means is disposed spaced radially from a rotational axis of the pivot means connecting the first and second members.

12. A device for adjusting the relative inclination of two elements, and in particular a back of a seat relative to a base of the seat, said device comprising:
    a base member;
    a back member;
    pivot means for connecting the base member to the back member and for allowing adjustable inclination of the back member relative to the base member;
    enveloping gear means pivotally connected to the base member for selective movement relative to the base member through a predetermined arc, said gear means having plastic concave teeth formed thereon with a first pitch diameter;
    motion transfer means for moving the back member in response to movement of said enveloping gear means; and
    enveloping worm means, rotatably connected to the base member and in double enveloping engagement with the enveloping gear means, for driving the gear means selectively along the predetermined arc, the worm means having a plastic concave worm with at least a single thread, the thread having a second pitch diameter smaller than the first pitch diameter of the gear means allowing more plastic teeth to be brought into contact with one another under high load conditions.

13. The device of claim 12 wherein said motion transfer means further comprises:
    a projection formed on one of the back member and the gear means with a complementary aperture formed in the other of the back member and the gear means.

14. The device of claim 12 wherein said motion transfer means is disposed spaced radially from a rotational axis of the pivot means connecting the back and base members.

15. The device of claim 14 further comprising:
    drive means for rotating the worm means in clockwise and counterclockwise directions.

16. The device of claim 14 further comprising:
    releasable lock means for preventing unintentional movement of the worm means in either rotational direction.

17. The device of claim 14 further comprising:
    biasing means for urging the gear means into engagement with the worm means during relative movement between said base and back members.

18. The device of claim 17 wherein said biasing means further comprises:
- cam means, pivotally connected between the gear means and the base member, for pivoting the gear means into engagement with the worm means about an offset axis; and
- spring means for biasing the cam means in a rotational direction such that the gear means is driven into positive engagement with said worm means.

19. The device of claim 18 wherein the cam means has an axis of rotation generally co-axial with a rotational axis of the pivot means.

20. A device for adjusting the relative inclination of two elements, and in particular, the relative inclination of a back member of an automotive seat pivotally connected about a rotational axis to a base member of the seat for movement through a predefined arc, the device comprising:
- at least an enveloping gear sector for pivotal connection to said base member about an axis generally co-axial with said rotational axis, said gear sector having plastic concave teeth formed thereon with a first pitch diameter;
- an enveloping worm for rotatable connection to said base member, said worm formed of at least one plastic concave worm having at least a single thread, said worm in double enveloping engagement with the gear sector and the thread having a second pitch diameter smaller than the first pitch diameter of the gear sector by approximately 20 percent;
- a rotatable cam pivotally connecting the gear sector to said base member, the rotatable cam pivotal along a predefined arc about an axis of rotation generally co-axial with said rotational axis of said back member;
- a spring biasing the rotatable cam in a rotational direction such that the gear sector is urged into positive engagement with the worm at any angular position of movement;
- a motion transmitting member connecting the gear sector to said back member at a position radially spaced from the rotational axis and generally disposed between the rotational axis and the teeth of the gear sector;
- drive means for rotating the worm in clockwise and counterclockwise directions; and
- releasable lock means for preventing unintentional movement of the worm in either rotational direction.

* * * * *